(12) United States Patent
Palmer et al.

(10) Patent No.: US 12,270,341 B2
(45) Date of Patent: Apr. 8, 2025

(54) GAS TURBINE ENGINE FUEL SYSTEM

(71) Applicant: ROLLS-ROYCE PLC, London (GB)

(72) Inventors: Chloe J Palmer, Derby (GB); Jacopo Tacconi, Derby (GB); Nicholas Grech, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/379,717

(22) Filed: Oct. 13, 2023

(65) Prior Publication Data

US 2024/0133343 A1 Apr. 25, 2024
US 2024/0229717 A9 Jul. 11, 2024

(30) Foreign Application Priority Data

Oct. 24, 2022 (GB) .................................... 2215721

(51) Int. Cl.
*F02C 7/224* (2006.01)
*F02C 3/22* (2006.01)
*F02C 7/14* (2006.01)

(52) U.S. Cl.
CPC ................ *F02C 7/224* (2013.01); *F02C 3/22* (2013.01); *F02C 7/14* (2013.01)

(58) Field of Classification Search
CPC .. F02C 7/222; F02C 7/224; F02C 7/14; F02C 3/22
See application file for complete search history.

(56) References Cited

U.S. PATENT DOCUMENTS

| | | | |
|---|---|---|---|
| 3,237,400 A * | 3/1966 | Kuhrt | F02C 7/224 60/260 |
| 4,942,733 A | 7/1990 | Hosford | |
| 5,482,791 A | 1/1996 | Shingai et al. | |
| 2007/0006592 A1* | 1/2007 | Balan | F02C 3/22 60/39.182 |
| 2007/0130957 A1* | 6/2007 | Hoffmann | F02C 6/18 60/39.15 |
| 2013/0276433 A1 | 10/2013 | Yamasaki et al. | |
| 2020/0088102 A1 | 3/2020 | Roberge | |
| 2021/0245629 A1 | 8/2021 | Klimpel | |
| 2022/0099020 A1 | 3/2022 | Palmer | |

(Continued)

FOREIGN PATENT DOCUMENTS

| | | |
|---|---|---|
| CA | 2247197 A1 | 8/1997 |
| EP | 3845747 A1 | 7/2021 |

(Continued)

OTHER PUBLICATIONS

Apr. 19, 2023 Search Report issued in British Patent Application No. 2215721.8.

(Continued)

*Primary Examiner* — Steven M Sutherland
(74) *Attorney, Agent, or Firm* — Oliff PLC (57) ABSTRACT

A gas turbine engine fuel system includes a fuel offtake configured to divert a portion of hydrogen fuel from a main fuel conduit, a burner configured to burn the portion of hydrogen fuel diverted from the main fuel conduit, a heat exchanger configured to transfer heat from exhaust gasses produced by the burner to hydrogen fuel in the main fuel conduit and a power recovery device configured to extract power from exhaust gasses of the burner downstream of the heat-exchanger.

14 Claims, 6 Drawing Sheets

(56) References Cited

U.S. PATENT DOCUMENTS

2022/0297844 A1    9/2022   Mackin et al.
2023/0053230 A1    2/2023   Jo et al.
2023/0358166 A1   11/2023   Veilleux, Jr. et al.

FOREIGN PATENT DOCUMENTS

| EP | 3978807 A2 | 4/2022 |
| --- | --- | --- |
| EP | 3995679 A1 | 5/2022 |
| EP | 4144970 A2 | 3/2023 |
| GB | 2295858 A | 6/1996 |
| WO | 97/31184 A1 | 8/1997 |

OTHER PUBLICATIONS

Apr. 24, 2023 Search Report issued in British Patent Application No. 2215722.6.
U.S. Appl. No. 18/379,728, filed Oct. 13, 2023 in the name of Nicholas Grech et al.
Feb. 26, 2024 Extended Search Report issued in European Patent Application No. 23199576.2.
Feb. 26, 2024 Extended Search Report issued in European Patent Application No. 231995770.0.
Dec. 6, 2024 Notice of Allowance received in U.S. Appl. No. 18/379,728.

\* cited by examiner

GAS TURBINE ENGINE FUEL SYSTEM

TECHNICAL FIELD

This disclosure relates to fuel systems for hydrogen-fueled aero gas turbine engines.

BACKGROUND

In order to limit emissions of carbon dioxide, use of hydrogen as an alternative to hydrocarbon fuel in gas turbine engines has historically only been practical in land-based installations. However, liquid hydrogen fueled airliners have recently been proposed. The liquid for fuel such aircraft however must be heated prior to combustion. Doing so in a manner which is efficient from an overall propulsion system perspective is a significant challenge.

SUMMARY

The invention is directed towards a gas turbine engine fuel system comprising a hydrogen fuel preheater for heating cryogenically-stored hydrogen fuel prior to injection into gas turbine engines, gas turbine engines incorporating such gas turbines, and methods of operating such gas turbines.

In a first aspect, one such gas turbine engine fuel system comprises:
- a fuel offtake configured and arranged to divert a portion of hydrogen fuel from a main fuel conduit;
- a burner configured and arranged to burn the portion of hydrogen fuel diverted from the main fuel conduit;
- a heat exchanger configured and arranged to transfer heat from exhaust gasses produced by the burner to hydrogen fuel in the main fuel conduit;
- a power recovery device configured to extract power from exhaust gasses of the burner downstream of the heat-exchanger.

In an embodiment, the power recovery device comprises a nozzle arranged to expand exhaust gasses to produce thrust. Advantageously, waste he at and pressure from the burner is recovered, and used for propulsive thrust, thereby reducing Thrust Specific Fuel Consumption (TSFC) of the gas turbine engine.

In an embodiment, the nozzle is provided separately to a gas turbine engine core nozzle.

In an embodiment, the exhaust communicates with a gas turbine engine core downstream of a gas turbine engine turbine stage, and the nozzle comprises an engine core nozzle. Advantageously, noise may be reduced by shielding the high velocity nozzle flow within the engine core flow.

In an embodiment, the power recovery device is a burner exhaust turbine. Advantageously, the waste heat and pressure in the burner exhaust flow can be used to power additional equipment via the exhaust turbine.

In an embodiment, the burner exhaust turbine is mechanically coupled to a load such as an electrical generator or engine accessory.

In an embodiment, the gas turbine engine fuel system comprises a fuel pump configured to pump the hydrogen fuel.

In an embodiment, the burner exhaust turbine is configured to drive the engine fuel pump.

In an embodiment, the burner exhaust turbine is directly coupled to the engine fuel pump to directly drive the engine fuel pump.

In an embodiment, the burner exhaust turbine is coupled to an electrical generator, the engine fuel pump is coupled to an electric motor, and the burner exhaust turbine is configured to drive the engine fuel pump electrically via the generator and motor.

In an embodiment, the burner exhaust turbine is configured to drive an auxiliary air compressor.

In an embodiment, the burner is arranged to be supplied with air for combustion from a core compressor bleed of a gas turbine engine. Advantageously, high pressure air is provided for combustion in the burner, thereby increasing burner exhaust turbine efficiency.

In an embodiment, the auxiliary air compressor is configured to further compress core compressor bleed air prior to delivery to the burner. Advantageously, the air compressor, burner, and burner turbine form a Brayton cycle arrangement (i.e. a gas turbine engine), in which compressed air for the burner is provided by a compressor which is driven by a turbine, which is in turn driven by hot gases provided by the burner. Such an arrangement is self-sustaining in operation. Additionally, by providing additional compression for the burner using the auxiliary compressor, lower pressure bleed air is required for the burner, which increases efficiency of the main propulsive gas turbine engine.

In an embodiment, the auxiliary air compressor is configured to provide air to a hydrogen fuel cell.

In a second aspect, there is provided a hydrogen-fueled gas turbine engine comprising a fuel system in accordance with the first aspect.

In an embodiment, the gas turbine engine comprises:
- a compressor for compressing inlet air for supply to the combustor; and
- a bleed air system configured to bleed compressed air from the compressor and supply it to the burner to burn with the portion of hydrogen fuel diverted from the main fuel conduit.

In another aspect, there is provided a method of delivering cryogenically-stored hydrogen fuel to a gas turbine engine, comprising:
- pumping the hydrogen fuel from a cryogenic storage system through a main fuel conduit;
- diverting a portion of hydrogen fuel from the main fuel conduit;
- burning the portion of hydrogen fuel diverted from the main fuel conduit in a burner;
- heating the hydrogen fuel in the main fuel conduit by exchanging heat produced by the burner thereto in a heat exchanger; and
- exhausting gasses of the burner through a power recovery device configured to extract power from the exhaust gasses of the burner, the power recovery device being provided downstream of the heat-exchanger.

In an embodiment, the method further comprises bleeding compressed air from a compressor of the gas turbine engine and supplying the compressed air to the burner to burn with the portion of hydrogen fuel diverted from the main fuel conduit.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
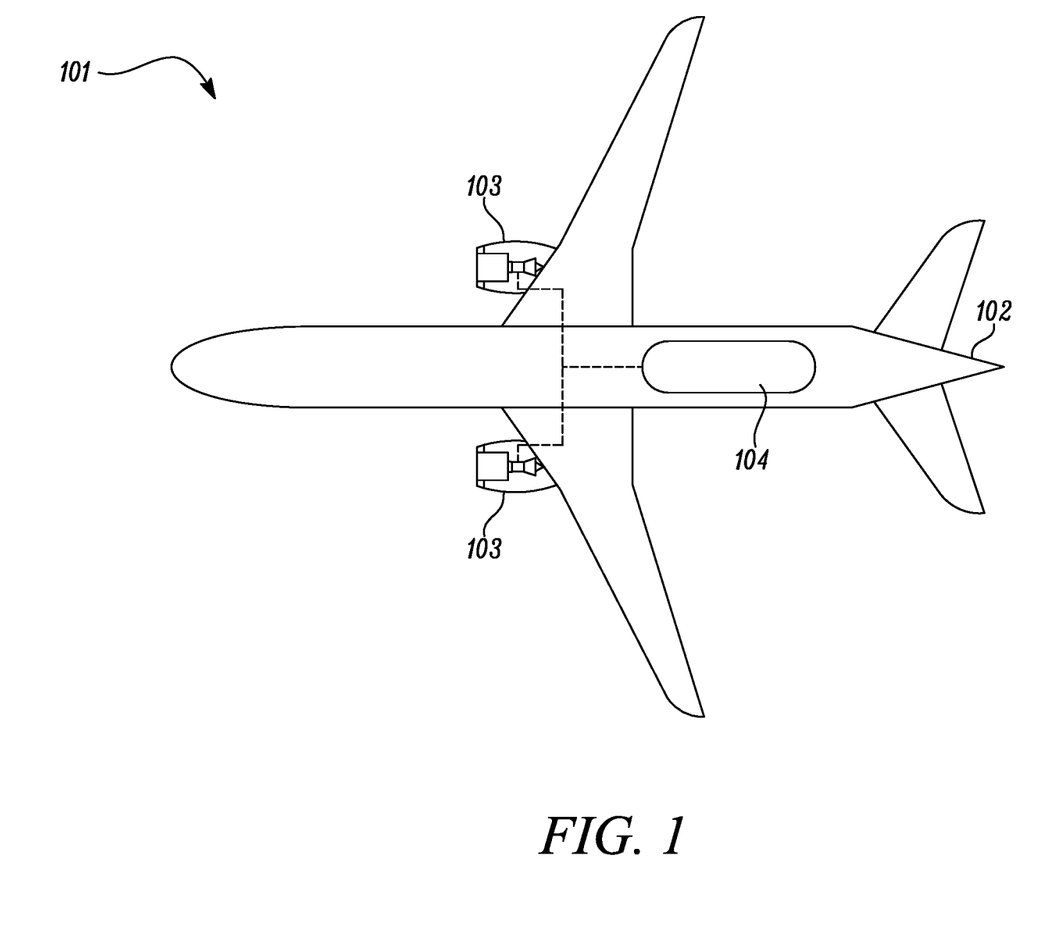
FIG. 1 shows a hydrogen-fueled airliner comprising hydrogen-fueled turbofan engines.

A hydrogen-fueled airliner is illustrated in FIG. 1. In this example, the airliner 101 is of substantially conventional tube-and-wing twinjet configuration with a central fuselage 102 and substantially identical underwing-mounted turbofan engines 103. In the present embodiment, the turbofan engines 103 are geared turbofan engines.

A hydrogen storage tank 104 located in the fuselage 102. In the present embodiment, the hydrogen storage tank 104 is a cryogenic hydrogen storage tank and thus stores the hydrogen fuel in a liquid state, in a specific example at 25 kelvin. In this example, the hydrogen fuel is pressurised to a pressure from around 1 bar to around 3 bar, in a specific example 4 bar.

Figure 2:
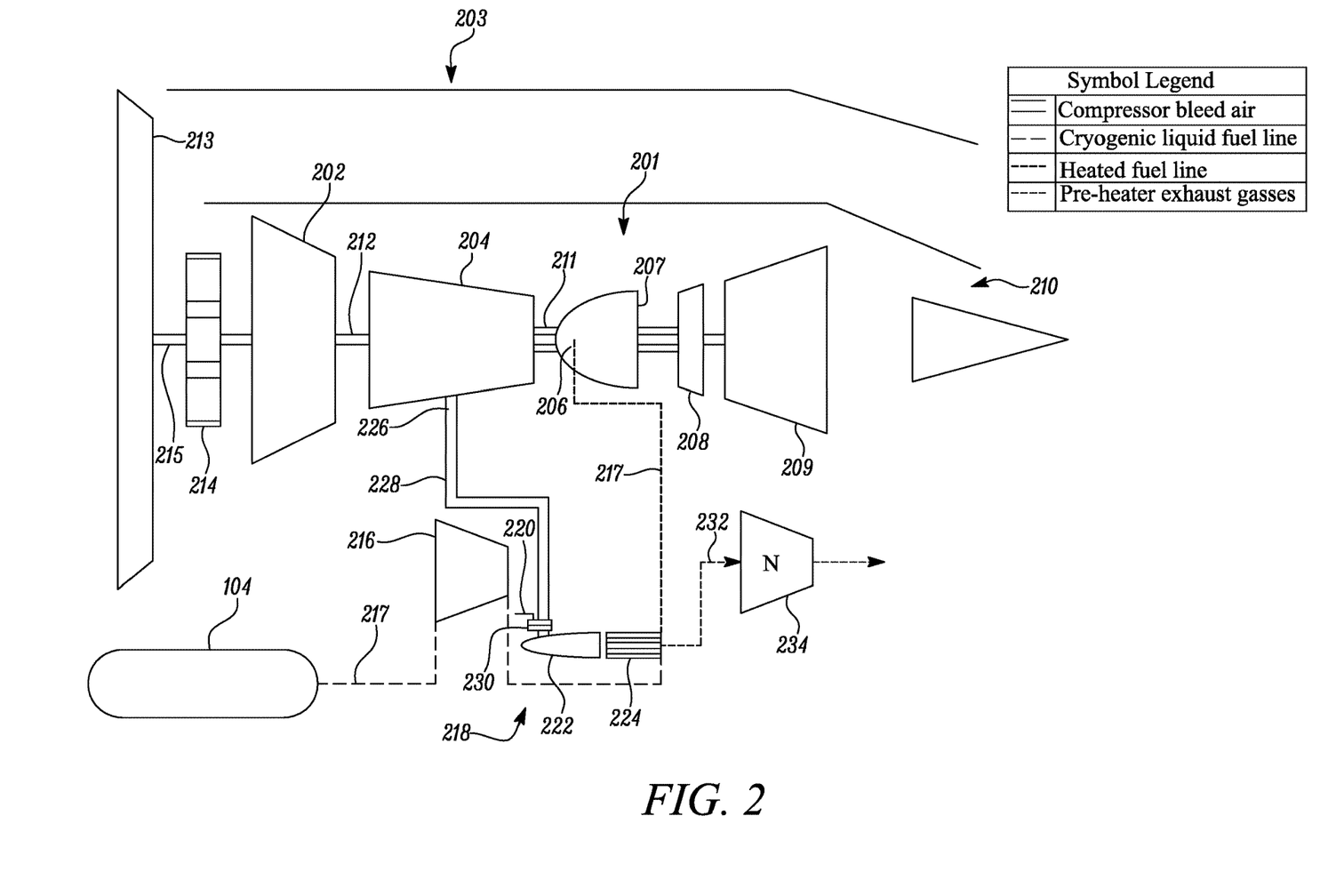
FIG. 2 is a block diagram of one of the engines of FIG. 1.

A block diagram of one of the turbofan engines 103 is shown in FIG. 2.

The turbofan engine 103 comprises a core gas turbine 201.

The core gas turbine 201 comprises, in fluid flow series, a low-pressure compressor 202, a high-pressure compressor 204, a fuel injection system 206, a combustor 207, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

As described previously, in the present embodiment, the turbofan engines 103 are geared turbofan engines. Thus in operation the low-pressure turbine 209 drives a fan 213 via a reduction gearbox 214. The reduction gearbox receives input drive from the second shaft 212 and provides output drive to the fan 213 via a fan shaft 215. In an embodiment, the reduction gearbox 214 is an epicyclic reduction gearbox. In a specific embodiment, it is a planetary reduction gearbox. Alternatively, it may be a star reduction gearbox, or a compound epicyclic reduction gearbox. As a further alternative, the reduction gearbox 214 could be a layshaft-type reduction gearbox or any other type of reduction gearbox. It will also be appreciated that the principles disclosed herein may be applied to a direct-drive type turbofan engine, i.e. in which there is no reduction gearbox between the low-pressure turbine and the fan.

In operation, hydrogen fuel is pumped from the hydrogen storage tank 104 by a pump 216 and into a main fuel conduit 217 which ultimately delivers fuel to the fuel injection system 206. In the present embodiment, the pump 216 is high-speed centrifugal pump. In a specific embodiment, the centrifugal pump comprises an axial inducer to minimise the required inlet pressure and to accommodate multiphase flow in addition to the centrifugal impeller for developing the majority of the required pressure rise. In an alternative embodiment, a piston-type pump could be used.

In an embodiment, the pump 216 is located inside the hydrogen storage tank 104. In this way leakage of hydrogen fuel past pump seals etc. is accommodated.

In an embodiment, the pump 216 is driven by an electric motor 317. In an embodiment, the drive means for the pump 216 are also located in the hydrogen storage tank 104.

As will be appreciated, it is desirable to increase the temperature of the fuel from cryogenic storage condition to a temperature much closer to the firing temperature of the core gas turbine 201; of course this is subject to the constraint of not exceeding the autoignition temperature of the hydrogen fuel prior to admission into the combustor 207. In an example, the injection temperature is from 250 to 300 kelvin, for example 250 kelvin. In some cases, it may be desirable to increase the fuel temperature to above an icing temperature, such as 273 kelvin.

In the present embodiment, a preheater 218 is therefore provided for heating of the hydrogen fuel. In the present embodiment, this takes place between the pump 216 and the fuel injection system 206. In an embodiment, the preheater 218 is configured to raise the temperature of the hydrogen fuel to the required injection temperature. The heating may provide a phase change (for example from liquid to supercritical or to gas), or the fluid may remain in a supercritical state after heating by the preheater.

In another embodiment, the preheater 218 is configured to raise the temperature of the hydrogen fuel to an intermediate temperature less than the injection temperature. This could for example be from 60 to 200 kelvin, for example 150 kelvin.

In a simple cycle configuration it has been determined that due to the significant heat capacity of the hydrogen fuel, even if it is utilised as a heatsink for engine waste heat, it will still not reach the required injection temperature without implementation of the preheater 218. Further, even in a complex cycle configuration in which the heat of combustion products is recuperated into the hydrogen fuel, it has been determined that at certain points in the operational envelope there will be insufficient heat output from the engine to raise the fuel temperature to the injection temperature. Such occasions may include, for example, ground start, in-flight relight, end of cruise idle, etc.

The preheater 218 comprises an offtake 220 to divert a portion of the hydrogen fuel from the main fuel conduit 217. The amount of hydrogen bled from the main fuel conduit 217 is controlled by a valve (not shown). In an embodiment, the valve is controlled actively, for example in response to the temperature of the fuel at the fuel injection system 206. Alternatively, the valve may be passively controlled. In operation, of the order of around 1 percent of the hydrogen fuel flow through the main fuel conduit 217 is bled for use in the preheater 218.

As described previously, hydrogen has very high specific and latent heat capacities; however as a gas, or as a supercritical fluid, it has a very low molecular weight and may have a lower density, and thus it can be challenging to exchange heat in a compact way. However, these properties may also be beneficial, as described later herein. Thus the preheater 218 vaporises the hydrogen fuel in the main fuel conduit 217 by combustion of the bled fuel in a burner 222 located in heat exchange relationship with the main fuel conduit 217.

In some embodiments, the burner 222 is concentric around the main fuel conduit 217 and hence the burner 222 itself comprises the heat exchanger for transferring heat to hydrogen fuel in the main fuel conduit 217. It will of course be appreciated that other arrangements are possible. For example, the burner 222 could be positioned separately from the main fuel conduit 217 and exhaust gases therefrom directed through a dedicated heat exchanger unit 224. Such a unit may comprise a first pass for the flow of hot exhaust products from the burner 222, and a second pass for the main fuel flow which then vaporises as it flows through the heat exchanger unit.

In the present embodiment, air for combustion with the bled hydrogen fuel is bled from the high-pressure compressor 204 from a compressor bleed 226 via a bleed air line 228. Alternatively, it may be bled from the low-pressure compressor 202. It will be appreciated that the air for combustion could be obtained from any other suitable location.

In the present example, the air and the bled hydrogen fuel are mixed in a pre-mixer 230 prior to supply to the burner 222, although in alternative embodiments it may be directly co-injected into the burner with the hydrogen fuel instead.

It should be understood that, in the present example, the products of combustion from the burner 222 are not mixed with the fuel in the main fuel conduit 217. In this respect, the preheater 218 therefore differs from a pre-burner system as used in staged combustion cycle rocket engines.

In steady state, there is enough heat emanating from the burner 222 to ensure vaporisation of the small amount of bled hydrogen fuel. At engine start or other cold conditions for example, the preheater 218 comprises a pre-heater 230 to ensure that the bled hydrogen fuel boils prior to mixing with air in the pre-mixer. In a specific embodiment, the pre-heater 230 comprises an electric heating element, for example an inductive coil. Alternatively, the pre-heater 230 could be simply configured as a boil volume, in which the ambient conditions therein contain sufficient enthalpy to boil the initial flow of bled hydrogen fuel prior to delivery to the pre-mixer and the burner 222.

As described previously, it is envisaged that the fuel delivery system 201 and fuel injection system 206 may be used in an embodiment of the core gas turbine 201 implementing a simple cycle as described with reference to FIG. 2, possibly with fuel cooling of engine or gearbox oil or cooling air. Alternatively, the core gas turbine engine 201 may implement a complex cycle.

Combustion products from the burner 222 are exhausted into an exhaust line 232 provided downstream of the heat exchanger 224.

The temperature through the exhaust is relatively low in all cases, in view of the heat transfer to the hydrogen fuel via the heat exchanger 224. Similarly, mass flow through the exhaust is relatively low, in view of the relatively small amount of fuel used by the burner. However, the available pressure is relatively high.

As such, energy from the exhaust flow can be recovered by a power recovery device configured to extract power from exhaust gasses of the burner downstream of the heat-exchanger.

In the present embodiment, the power recovery device is an exhaust nozzle 234 in the form of a convergent-divergent nozzle, arranged to provide thrust. The convergent-divergent nozzle may be arranged to provide exhaust flow which exits into either the core nozzle or the nacelle to provide thrust to augment that provided by the engine core and fan.

The temperature through the exhaust is relatively low in all cases, in view of the heat transfer to the hydrogen fuel via the heat exchanger 224. Similarly, mass flow through the exhaust is relatively low, in view of the relatively small amount of fuel used by the burner. However, the available pressure is relatively high. As such, flow expanded through a convergent-divergent nozzle can be "choked", i.e. accelerated to supersonic speeds in the convergent section, before being expanded again in the divergent section. Such an arrangement is known as a "De Leval" nozzle, and is an efficient means of generating thrust.

In modelling conducted by the inventors, a significant amount of thrust, in the region of 15% of overall engine maximum take-off thrust, can be generated by this nozzle. This represents a significant contribution to overall thrust provided by the engine. As such, the thrust required from the core and fan flow can be reduced for an overall net thrust requirement, resulting in a significant SFC reduction of between 1.8 and 2.8%. This is in turn represents a surprisingly high overall fuel burn reduction, with no requirement for any additional moving parts.

Figure 3:
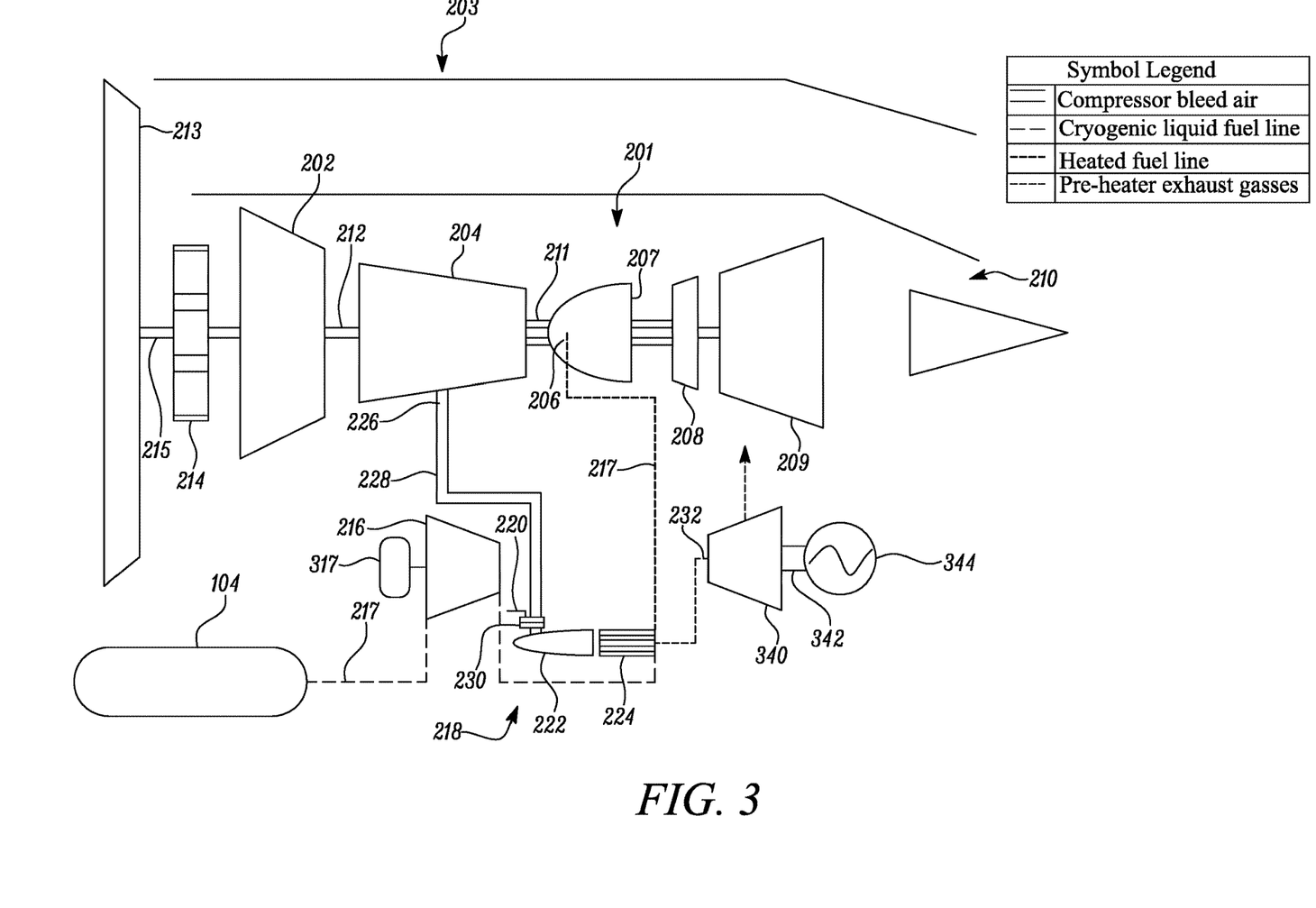
FIG. 3 is a block diagram of one of the engines of FIG. 1 having a first alternative fuel system.

A second embodiment of the gas turbine engine 203 is shown in FIG. 3. In this embodiment, the power recovery device is in the form of a turbine 340 in place of the nozzle 234. The stream turbine is of conventional construction, and is configured to receive a hot, high pressure input from the exhaust line 232, and exhaust spent, low pressure into the core nozzle or bypass stream.

The turbine 340 is coupled to a load, which in this embodiment comprises a generator 344, via a mechanical shaft 342. As such, the turbine 340 can be used to generate electrical power from waste energy in the pre-burner exhaust stream. As will be understood, different loads such as engine or aircraft hydraulic pumps could be employed in place of the generator 344.

A significant portion of overall aircraft electrical power needs can be generated by such a generator. As such, aircraft shaft power extraction for electrical power generation can be significantly reduced. In some cases, an electric motor may be provided for re-introducing shaft power into the gas turbine engine, in a hybrid propulsion configuration.

Figure 4:
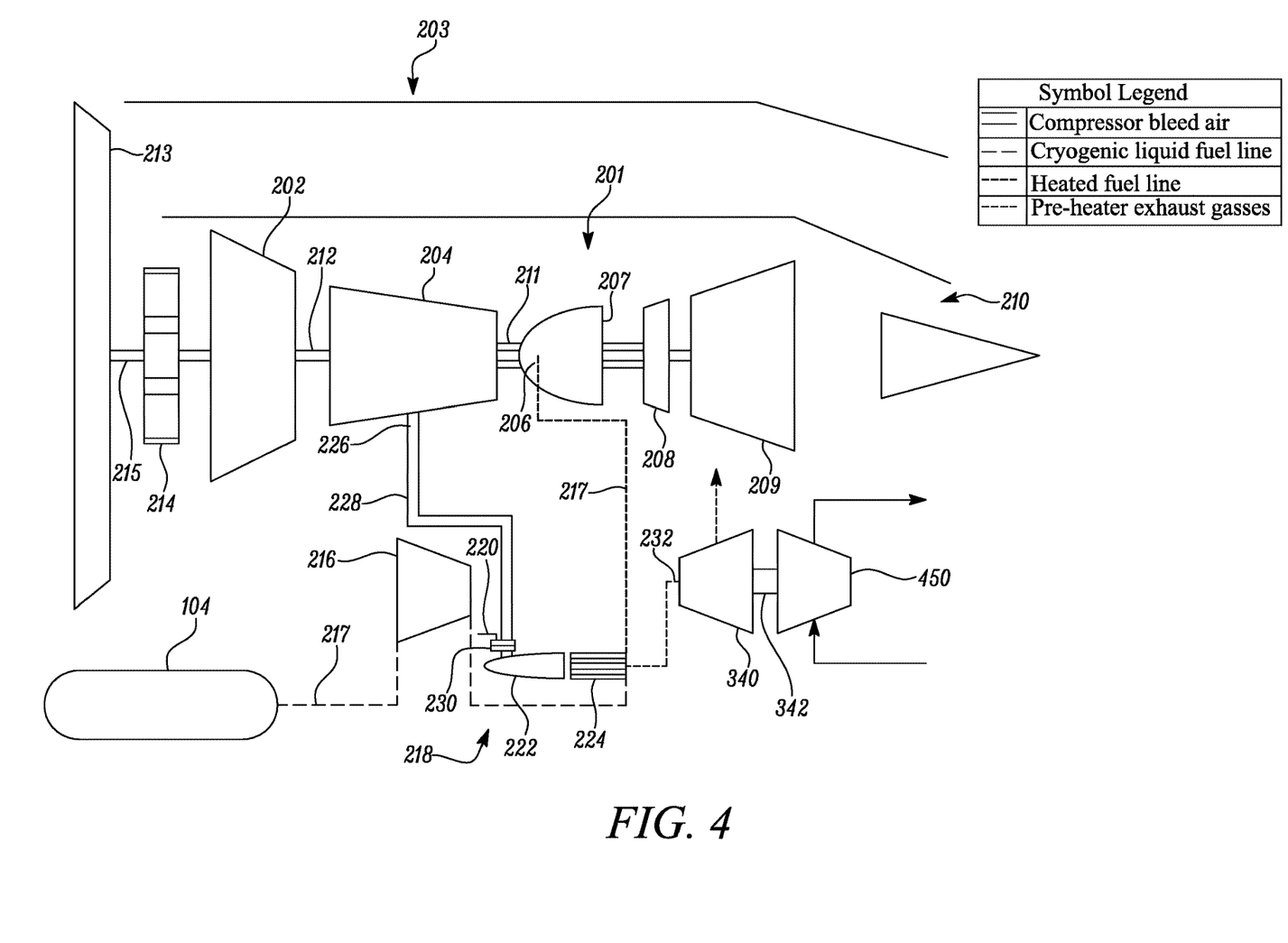
FIG. 4 is a block diagram of one of the engines of FIG. 1 having a second alternative fuel system.

In other embodiment, the generator 344 can be replaced by different loads. FIG. 4 shows an embodiment in which the generator 342 is replaced by an auxiliary compressor 450 driven by the turbine 340. Consequently, high pressure air can be provided for various purposes. In one example, the compressor 450 is utilised to power pneumatic systems such as actuators. In another example, the compressor air is used to provide cabin pressurisation and air conditioning. As such, compressor bleed air requirements are reduced, thereby improving compressor operability and reducing compressor design constraints.

Figure 5:
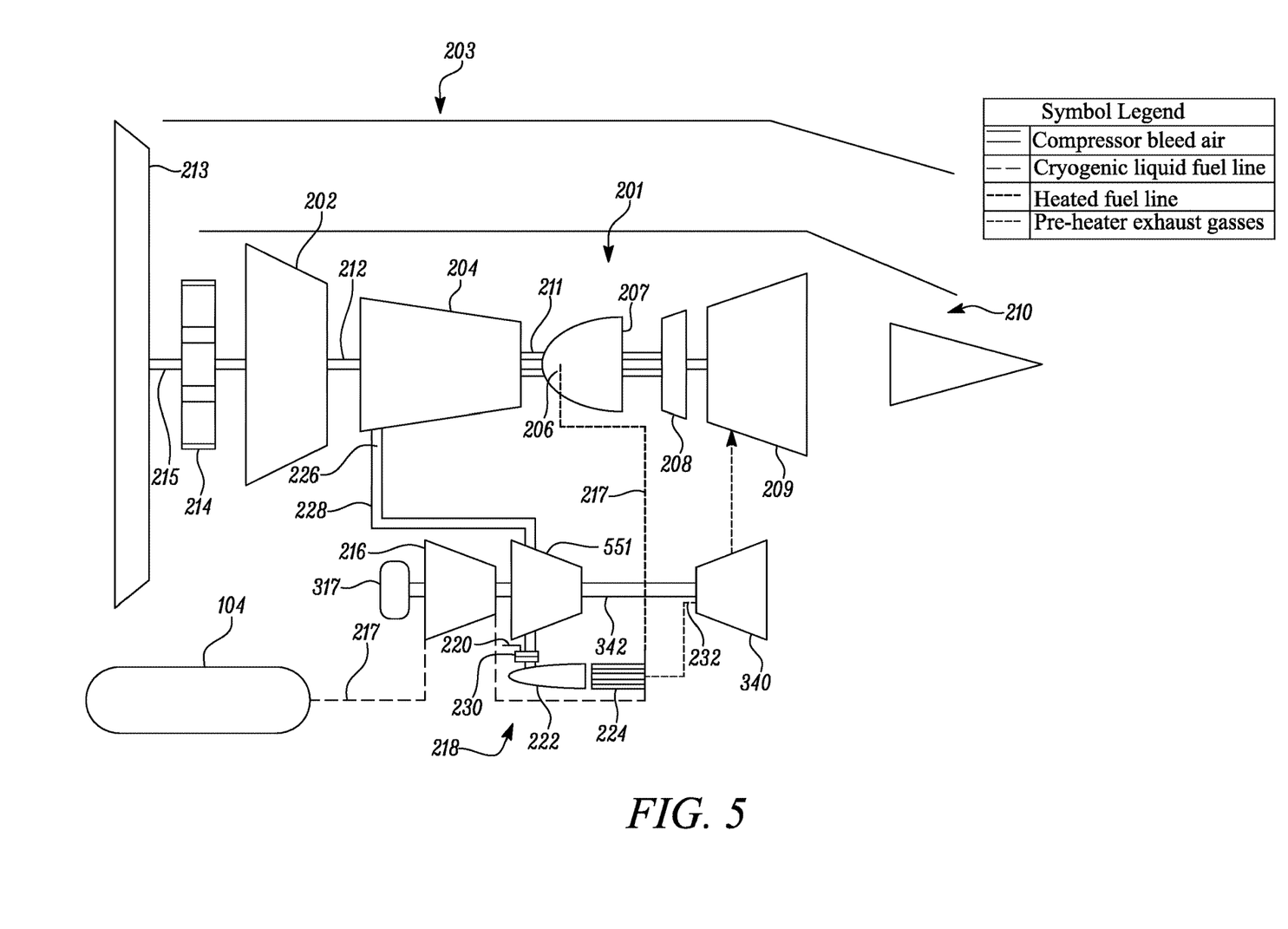
FIG. 5 is a block diagram of one of the engines of FIG. 1 having a third alternative fuel system.

FIG. 5 shows a further embodiment, in which an auxiliary compressor is used in a different manner.

In this embodiment, an auxiliary compressor 551 is driven by the burner turbine 340 by a shaft 342. However, unlike the embodiment of FIG. 4, the auxiliary compressor 541 is placed in the air flow path of the bleed air from the main gas turbine engine core compressor 204, upstream of the burner 222. As such, the auxiliary compressor is configured to further compress compressed bleed air prior to introduction to the burner 222.

Consequently, the auxiliary compressor 551, burner 222 and burner turbine 340 act as a Brayton cycle gas turbine engine. Such a cycle may produce excess shaft power, which can be used for various purposes. For example, as shown in FIG. 4, the shaft 342 may optionally mechanically drive the hydrogen fuel pump 216 either alone, or in combination with an electric motor. Consequently, pumping losses are reduced, and therefore overall system efficiency is increased.

Additionally, the minimum pressure requirements of the burner 222 can be met using lower initial pressure flow from the engine core compressor 204. As such, an earlier compressor stage bleed is utilised, as shown in FIG. 5. In some cases, bleed flow can be taken from the low-pressure compressor 202 rather than the high-pressure compressor 204, or from an earlier stage of the high-pressure compressor 204 compared to the embodiments shown in FIGS. 1 to 4. As such, less pneumatic power is drawn from the main engine core, thereby increasing core overall pressure ratio or reducing turbine load. In either case, core engine thermal efficiency is increased, thereby further increasing overall engine fuel efficiency.

Additional benefits are also provided. For example, a higher pressure air flow may be provided to the burner 222 compared to the embodiments in FIGS. 1 to 4. As such, the burner can be physically smaller and lighter, while providing the same quantity of heat to the main fuel flow.

The system may be easier to start, requiring less main engine compressor pressure to provide combustion in view of the additional pressure rise provided by the auxiliary compressor 551. In embodiments where the system includes an electric machine 317 coupled to the shaft 342, the electric machine can be driven by the turbine 340 to be utilised as an electric generator during operation, and may be adapted as an electric motor to drive at least the auxiliary compressor 551 and optionally the fuel pump 216 during starting. As such, the burner 218 can be operated independently of the main gas turbine engine 203 to raise fuel temperature for starting, and can even be used as an auxiliary power unit (APU) to start the main engine via a main engine starter-generator (not shown) using power from the electric machine 317, or provide auxiliary power for aircraft systems when the aircraft is non-operational.

In some cases, more complex gas turbine cycles may be employed with the burner 222. For example, the hydrogen compressor 216 may be powered by a separate turbine (not shown) and shaft (not shown) provided downstream or upstream in burner flow to the turbine 340. As such, the power and rotational speed requirements of the auxiliary compressor 551, hydrogen pump and/or electric machine 317 can be appropriately matched.

An additional feature of the embodiment of FIG. 5 is the provision of an exhaust line 232 which flows into the core engine exhaust either within or aft of the turbine 209. As such, additional power can be extracted from the exhaust, either as thrust, or as motive power introduced to the main core gas turbine engine.

Figure 6:
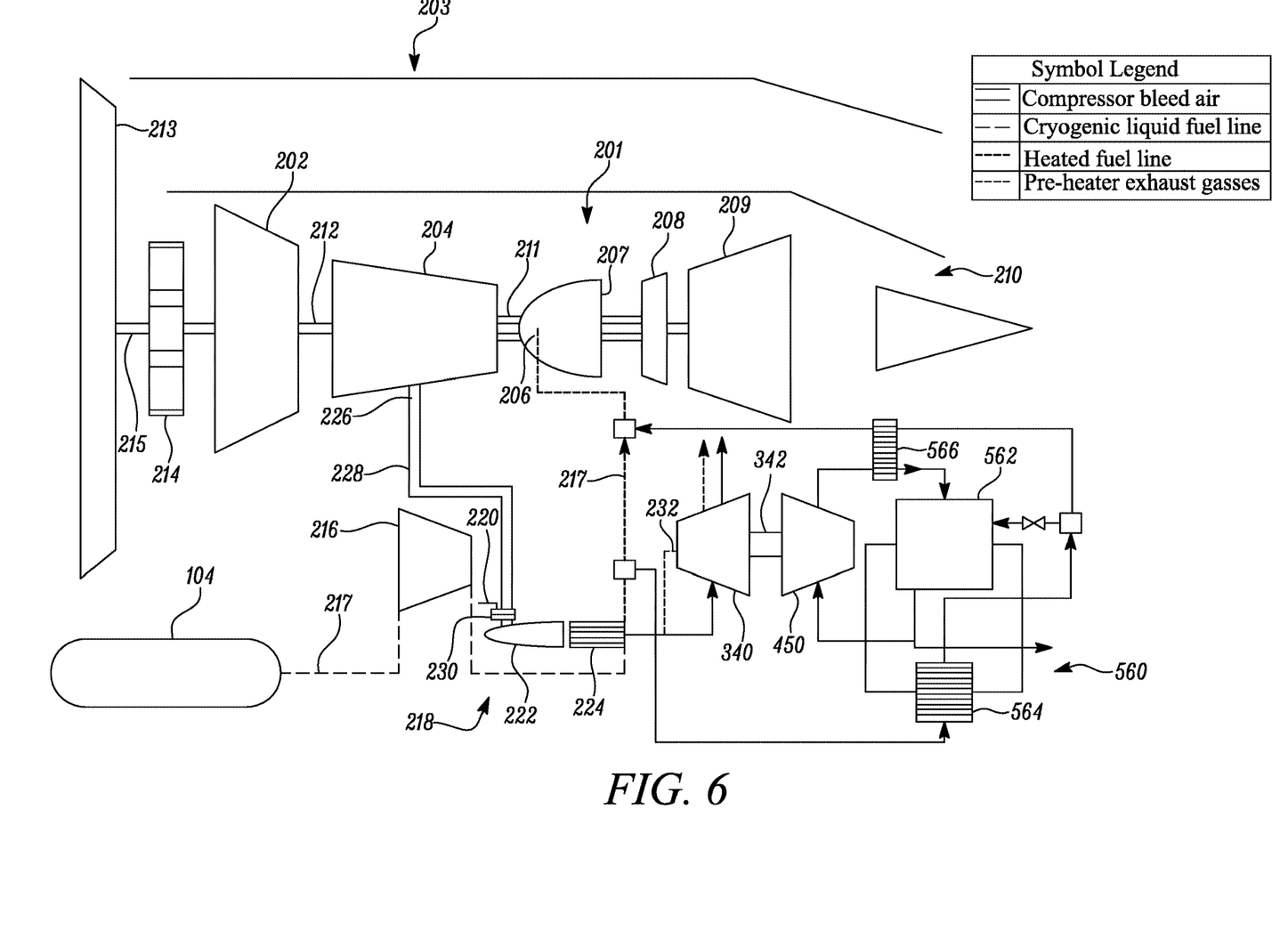
FIG. 6 is a block diagram of one of the engines of FIG. 1 having a fourth alternative fuel system.

Other uses of the compressed air from auxiliary compressor 450 are envisaged. FIG. 6 shows an embodiment of the gas turbine engine 203 having a hydrogen fuel cell arrangement. The hydrogen fuel cell arrangement comprises a hydrogen fuel cell 562, which takes oxygen from air and fuel in the form of hydrogen to generate electricity. Waste heat from the fuel cell is reintroduced into the fuel system downstream of the fuel cell via one or more heat exchangers 564, 566.

The air for the hydrogen fuel cell is provided by the auxiliary compressor 450, while the gaseous hydrogen fuel is tapped off from the main fuel line 217 downstream of the heat exchanger 224. As such, a dedicated high pressure air flow is provided for the hydrogen fuel cell, which is at least partly independent of engine operating conditions. Meanwhile, power for the air compression is provided from waste power as a result of the gas turbine engine fuel system, thereby increasing overall operational efficiency of the propulsion system as a whole. As such, the fuel cell can be operated as required. Additionally, waste heat from the fuel cell 562 is exhausted back into the main gas turbine engine 10, thereby further increasing operational efficiency.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. A gas turbine engine fuel system comprising:
   a fuel offtake configured to divert a portion of hydrogen fuel from a main fuel conduit;
   a burner configured to burn the portion of hydrogen fuel diverted from the main fuel conduit;
   a heat exchanger configured to transfer heat from exhaust gasses produced by the burner to hydrogen fuel in the main fuel conduit; and
   a power recovery device configured to extract power from the exhaust gasses of the burner downstream of the heat exchanger,
   wherein the power recovery device is a burner exhaust turbine.

2. A gas turbine engine fuel system according to claim 1, wherein the power recovery device comprises a nozzle arranged to expand the exhaust gasses to produce thrust.

3. A gas turbine engine fuel system according to claim 1, wherein the burner exhaust turbine is mechanically coupled to a load.

4. A gas turbine engine fuel system according to claim 3, wherein the gas turbine engine fuel system comprises a fuel pump configured to pump the hydrogen fuel, and the burner exhaust turbine is configured to drive the fuel pump.

5. A gas turbine engine fuel system according to claim 4, wherein the burner exhaust turbine is directly coupled to the fuel pump to directly drive the fuel pump.

6. A gas turbine engine fuel system according to claim 4, wherein the burner exhaust turbine is coupled to an electrical generator, the fuel pump is coupled to an electric motor, and the burner exhaust turbine is configured to drive the fuel pump electrically via the electrical generator and electric motor.

7. A gas turbine engine fuel system according to claim 1, wherein the burner exhaust turbine is configured to drive an auxiliary air compressor.

8. A gas turbine engine fuel system according to claim 7, wherein the auxiliary air compressor is configured to further compress core compressor bleed air prior to delivery to the burner.

9. A gas turbine engine according to claim 7, wherein the auxiliary air compressor is configured to provide air to a hydrogen fuel cell.

10. A gas turbine engine fuel system according to claim 1, wherein the burner is arranged to be supplied with air for combustion from a core compressor bleed of a gas turbine engine.

11. A gas turbine engine fuel system according to claim 10, wherein the burner exhaust turbine is configured to drive an auxiliary air compressor and the auxiliary air compressor is configured to further compress core compressor bleed air prior to delivery to the burner.

12. A hydrogen-fuelled gas turbine engine comprising the gas turbine engine fuel system in accordance with claim 1.

13. A method of delivering cryogenically-stored hydrogen fuel to a gas turbine engine, comprising:
   pumping the hydrogen fuel from a cryogenic storage system through a main fuel conduit;
   diverting a portion of hydrogen fuel from the main fuel conduit;
   burning the portion of hydrogen fuel diverted from the main fuel conduit in a burner;

heating the hydrogen fuel in the main fuel conduit by exchanging heat produced by the burner thereto in a heat exchanger; and exhausting gasses of the burner through a power recovery device configured to extract power from the gasses of the burner, the power recovery device being provided downstream of the heat exchanger, wherein the power recovery device is a burner exhaust turbine.

14. A gas turbine engine fuel system comprising:

a fuel offtake configured to divert a portion of hydrogen fuel from a main fuel conduit;

a burner configured to burn the portion of hydrogen fuel diverted from the main fuel conduit;

a heat exchanger configured to transfer heat from exhaust gasses produced by the burner to hydrogen fuel in the main fuel conduit; and a power recovery device configured to extract power from the exhaust gasses of the burner downstream of the heat exchanger, wherein the burner is arranged to be supplied with air for combustion from a core compressor bleed of a gas turbine engine.

\* \* \* \* \*